United States Patent
Baney et al.

(10) Patent No.: US 6,825,934 B2
(45) Date of Patent: Nov. 30, 2004

(54) VIBRATION NOISE MITIGATION IN AN INTERFEROMETRIC SYSTEM

(75) Inventors: Douglas M. Baney, Los Altos, CA (US); Gregory D. Van Wiggeren, Los Gatos, CA (US); Ali Motamedi, Los Altos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 211 days.

(21) Appl. No.: 10/099,480

(22) Filed: Mar. 14, 2002

(65) Prior Publication Data

US 2003/0174338 A1 Sep. 18, 2003

(51) Int. Cl.[7] ............................................. G01B 9/02
(52) U.S. Cl. ....................................................... 356/477
(58) Field of Search ........................... 356/73.1, 477, 356/519; 250/227.19, 227.27

(56) References Cited

U.S. PATENT DOCUMENTS

| 4,325,635 | A | * | 4/1982 | Sattler et al. ................ 356/484 |
| 5,202,745 | A | * | 4/1993 | Sorin et al. ................. 356/73.1 |
| 5,638,304 | A | | 6/1997 | Billoud |
| 6,286,644 | B1 | | 9/2001 | Wakui |
| 6,486,961 | B1 | * | 11/2002 | Szfraniec et al. ............ 356/477 |
| 6,559,946 | B2 | * | 5/2003 | Davidson et al. ............ 356/450 |

* cited by examiner

Primary Examiner—Samuel A. Turner
Assistant Examiner—Michael A. Lyons

(57) ABSTRACT

In the measurements of optical characteristics, such as measurements of group delay using an interferometric system, vibration noise can be at least partially offset by providing corrections on the basis of detecting light patterns that are indicative of the vibration noise. In each embodiment, light beams propagating through first and second paths are combined to form an interference signal, which is analyzed to provide the basis for the adjustments.

25 Claims, 11 Drawing Sheets

VIBRATION NOISE MITIGATION IN AN INTERFEROMETRIC SYSTEM

TECHNICAL FIELD

The invention relates generally to obtaining measurements for optical characteristics of a device under test and more particularly to reducing the effects of vibration noise on the process of obtaining the measurements.

BACKGROUND ART

Techniques for testing or analyzing optical components are currently available. A "device" under test (DUT), such as a length of fiberoptic cable, may be tested for faults or may be analyzed to determine whether the device is suitable for use in a particular application. System components such as multiplexers, demultiplexers, cross connectors, and devices having fiber Bragg gratings may be separately tested before they are used in assembling a system.

Optical testing may be performed using a heterodyne optical network analyzer. Such analyzers are used for measuring optical characteristics of optical components. For example, the "group delay" of a component may be important in determining the suitability of the component for a particular system. Group delay is sometimes referred to as envelope delay, since it refers to the frequency-dependent delay of an envelope of frequencies. The group delay for a particular frequency is the negative of the slope of the phase curve at that frequency.

Typically, a heterodyne optical network analyzer includes two interferometers. FIG. 1 is an example of one type of heterodyne optical network analyzer 10. The analyzer includes two interferometers 12 and 14 connected to a tunable laser source (TLS) 16. The TLS generates a laser light beam that is split by a coupler 18. The TLS is continuously tuned, or swept, within a particular frequency range. By operation of the coupler 18, a first portion of the coherent light from the TLS is directed to the DUT interferometer 12, while a second portion is directed to the reference interferometer 14.

The DUT interferometer 12 has a second coupler 22 that allows beam splitting between a first arm 24 and a second arm 26. A mirror 28 is located at the end of the first arm and a DUT 20 is located near the reflective end of the second arm. The lengths of the two arms can differ, and the difference in the optical path length is represented in FIG. 1 by $L_{DUT}$. Since the DUT can be dispersive, the actual optical path length is a function of frequency. A detector 30 is positioned to measure the combination of the light reflected by the mirror 28 and the light reflected by the DUT 20. Processing capability (not shown) is connected to the detector. Assuming the two arms 24 and 26 have different lengths, the light from one of the arms will be delayed by a time $T_1$ with respect to light from the other arm. Generally, $T_1$ varies as a function of frequency, since the DUT is typically dispersive. The two beam portions interfere when they recombine at the coupler 22. By analyzing the signal that is generated at the detector 30, the group delay and other properties of the DUT may be determined. However, in order to very precisely measure the group delay, it is necessary to obtain knowledge of the frequency tuning of the TLS 16 as a function of time. The reference interferometer 14 is used for this purpose.

The structure of the reference interferometer 14 is similar to that of the DUT interferometer 12, but a mirror 32 takes the place of the DUT 20. A second detector 34 receives light energy that is reflected by the combination of the mirror 32 at the end of a third arm 36 and a mirror 38 at the end of a fourth arm 40. As in the DUT interferometer, the lengths of these two arms 36 and 40 can be different, and this difference in lengths is represented by $L_{REF}$. The signal that is generated by the second detector 34 is also an interference signal (i.e., an intensity signal having an interference term) that is responsive to the combination of light from the two arms. However, the optical characteristics of the reference interferometer are relatively fixed and therefore predictable. Consequently, the reference interferometer can be used to measure the major variable to its operation, i.e., frequency sweep $\omega(t)$.

A concern is that vibrations to the system will diminish the precision of measurements such as group delay, group velocity, transmissivity, reflectivity, and chromatic dispersion. For example, vibrations of the second arm 26 on which the DUT 20 resides will act to change the index of refraction of the arm, which in turn acts as perturbations to the phase delay measured by processing the signal from the detector 30. The effects of vibrations on the precision of such measurements similarly occur in transmission-type interferometers, where an interference signal is formed as the combination of two beam portions that have propagated through the two arms of an interferometer without reflection. Thus, detectors are at the ends of the arms opposite to the TLS that generates the original beam. Transmission-type interferometers, such as Mach-Zehnder interferometers, are well known in the art.

One method of addressing the vibration concern is to provide vibration isolation of the heterodyne optical network analyzer 10. For example, the system may be supported on a platform that is specifically designed to minimize vibrations. However, additional or substitute techniques are desired. What is needed is a method and system for significantly reducing the risk that vibrations will adversely affect the performance of an interferometer.

SUMMARY OF THE INVENTION

In accordance with the invention, vibration noise within an interferometric system has reduced effects as a result of monitoring light patterns and providing corrections on the basis of the light patterns. Light propagating through a first path of the system is combined with light propagating through a second path to form at least one interference signal. Within each of the embodiments of the invention, the combination of light from the two paths is analyzed to provide a basis for the corrections.

In one embodiment, a partial reflector is added to an interferometer for analyzing a device under test (DUT), such as a fiber optic cable or the like. A source of a sweeping frequency beam is coupled to the two paths, or arms, so that beam portions are introduced to the two paths. As one possibility, the source of the beam is a tunable laser source (TLS). The DUT and the partial reflector are connected in close proximity along one of the paths. Therefore, vibrations experienced by the DUT are likely to be experienced in generally equal magnitude by the partial reflector, so that the vibration noise effects of the two components will be generally equal. Moreover, the radian frequencies at the two components will remain substantially the same as the TLS sweeps through its frequency range. With these approximations, the effects of vibration can be reduced by using techniques such as determining the phase difference between the phase of the interference signal for the DUT and the phase of the interference signal for the partial reflector.

This phase difference can then be applied in known approaches to determining optical characteristics of the DUT, such as measurements of group delay, group velocity, transmissivity, reflectivity and chromatic dispersion.

The use of the partial reflector works well in reflection interferometers, i.e., interferometers in which the interference signal is formed of reflected light from the two paths. However, the same approach may be used in a transmission interferometer in which the interference signal is formed by combining light that has propagated through the two paths. The first path having the DUT may include a shunt in parallel with the DUT. Reduction of vibration noise during analysis of the DUT can be achieved if the shunt is located so that it is likely to experience the same vibrations as the DUT. When the shunt and the DUT are approximately the same length (but not exactly the same length) and experience approximately the same magnitude of vibration, the effects of the vibrations on measurements of the optical characteristics of the DUT can be reduced. The shunt and DUT should not be exactly the same length, since such an arrangement would cause interference specific to propagation through the shunt to be indistinguishable from interference specific to propagation through the DUT.

As another alternative to using partial reflectors, measurements of Rayleigh Backscatter can be considered. Since the section of optical fiber closest to the DUT would experience approximately the same vibration noise as the DUT, the ideal selection of the Rayleigh Backscattered signal to be considered is the signal section that corresponds to the path region closest to the DUT. Known techniques may be used to filter a portion of the interference signal data to calculate the vibration noise of the section. The calculated vibration noise can be subtracted from the DUT response in much the same manner as the reflections from the partial reflector are used.

In yet another embodiment, the effects of vibration are reduced by providing the TLS as the means for measuring the optical characteristics of the DUT, but adding a second source of light as a means for measuring vibrations. The second source may be a fixed frequency source, with the frequency being outside of the frequency range of the TLS. However, other arrangements are contemplated. Both the TLS and the fixed frequency source of light provide beam portions that are propagated along the two paths, but then recombined to form the interference signals. Particularly, where the fixed frequency is outside of the frequency range of the TLS, it is easily possible to distinguish the interference signal of the fixed frequency light from the interference signal of the sweeping frequency light. Typically, wavelength filtering is used to distinguish the two interference signals. Since the frequency of the added interference signal is fixed, changes are most likely to be a result of vibrations. Therefore, monitoring the changes in the interference signal allows the vibration noise to be isolated in the interference signal of the TLS light. In one application, the phase of the fixed frequency interference signal is tracked and is used in providing an offset in the calculation of the optical characteristics of the DUT, such as in calculating group delay. In another application, calculations with respect to the fixed frequency interference signal are used to provide mechanical adjustments, rather than calculation adjustments. As an example, the length of one of the two paths may be dynamically adjusted to offset the effects of vibrations. A piezoelectric mechanism may be dynamically controlled to change the length of the second arm to compensate for the vibration-induced "changes" in length of the DUT arm (since vibrations cause "effective" length changes).

An advantage of the invention is that much of the error that occurs as a result of vibrations of an interferometric system is eliminated using the described approaches. These approaches may be used in combination with known techniques, such as mounting the system on a vibration-isolation platform. More accurate and reliable determinations of the optical characteristics of a DUT can then be achieved.

DETAILED DESCRIPTION

Figure 1:
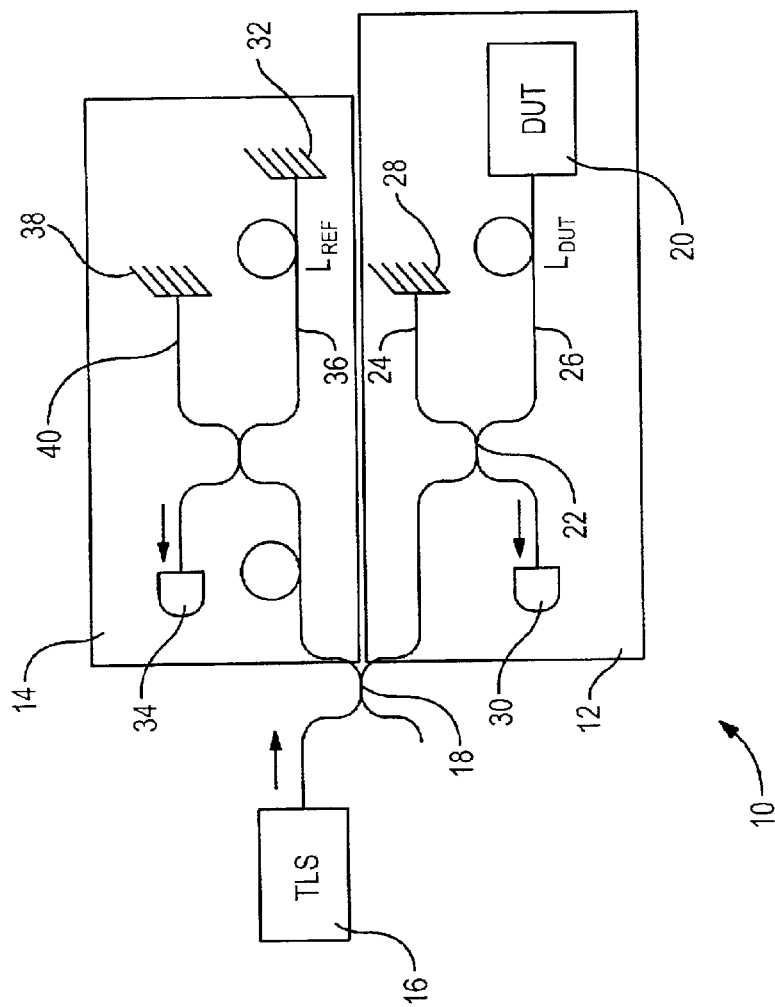
FIG. 1 is a block diagram of a heterodyne optical network analyzer in accordance with the prior art.
Figure 2:
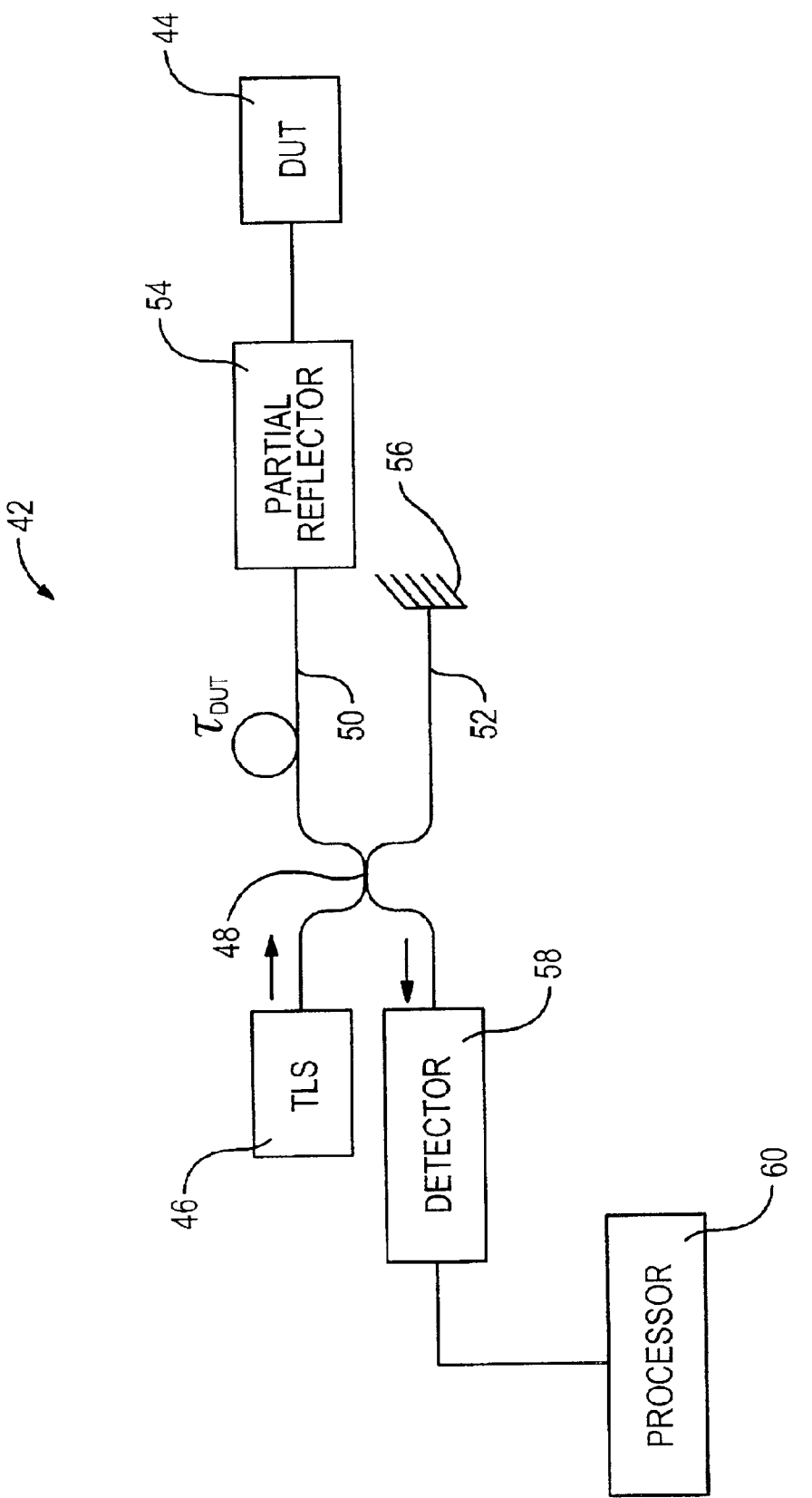
FIG. 2 is a schematic illustration of a reflection interferometer in accordance with one embodiment of the invention.

With reference to FIG. 2, a test interferometer 42 having vibration noise reduction will be described with reference to acquiring measurements of group delay. However, the interferometer may be used for other measurements that are relevant to optical characteristics of a device under test (DUT) 44, such as measurements of group velocity, transmissivity, reflectivity and chromatic dispersion. Moreover, the vibration noise reduction may be used in other interferometric systems. For example, rather than the reflection interferometer of FIG. 2, vibration noise reduction may be incorporated into a transmission interferometer, as will be explained more fully below. Additionally, any of the embodiments may be used in a heterodyne optical network analyzer that includes a reference interferometer of the type described with reference to FIG. 1. Thus, in addition to the conventional Michelson and Mach-Zehnder configurations, the invention may be used in other interferometer architectures.

A tunable laser source (TLS) 46 may generate swept-frequency light that is split by a coupler 48 into beam portions that enter first and second arms 50 and 52 of the test interferometer 42. The first arm 50 defines a path that includes a partial reflector 54 and the DUT 44. At the end of the second arm 52 is a mirror 56. The beam portions propagate through the separate arms, but are reflected and then recombined by the operation of the coupler 48. A detector 58 is positioned to sense the intensity of the recombined beam. A processor 60 is configured to use the output of the detector to determine optical characteristics of the DUT 44.

The input of the detector 58 is an interference signal (an intensity signal with an interference term), since it is a combination of the reflected beam portions from the first arm 50 and the second arm 52. The detector may merely be a photoreceiver that measures an intensity I as a function of time t, where:

$$I(t) = I_{arm1} + I_{arm2} + 2(I_{arm1} I_{arm2} \cos \phi(t)) \qquad \text{Eq. 1}$$

That is, the measured intensity is a function of the intensities of the light from the two arms and is a function of the relative phase of the lightwaves at time t. For group delay measurements, $\phi(t)$ is an important component of Eq. 1.

The $\phi_{DUT}(t)$ measured by the test interferometer 42 at time t is $$\Phi_{DUT}(t) = 2\pi \left[ v_0 + yt - \frac{y}{2} T_{DUT} \right] T_{DUT} \qquad \text{Eq. 2}$$

$$= \omega \left( t - \frac{T_{DUT}}{2} \right) T_{DUT} = \omega_{DUT} T_{DUT}$$

where the subscript "DUT" indicates that the variable is associated with calculations for the DUT 44 connected to the test interferometer, $\omega(t)$ is the radian frequency produced by the TLS 46, $v_o$ is the initial frequency of the swept laser light, $\gamma$ is the rate of the sweep of the TLS in units of Hz/second, and $T_{DUT}$ is the relevant delay introduced by the difference in the lengths of the two arms 50 and 52. For a dispersive DUT, $T_{DUT}$ can vary with frequency.

The radian frequency $\omega(t)$ of the light produced by the TLS 46 is swept in time and can be written as $$\omega(t) = 2\pi[v_0 + \gamma t] \qquad \text{Eq. 3}$$

Under the proper conditions with regard to the random phase evolution, the absence of phase noise, and the absence of vibrations to the test interferometer 42, group delay $T_g$ of the DUT 44 can be obtained from $$T_g \equiv \frac{d\Phi_{DUT}}{d\omega} = \frac{\frac{d\Phi_{DUT}}{dt}}{\frac{d\omega_{DUT}}{dt}} = T_{DUT} + \omega_{DUT} \frac{\partial T_{DUT}}{\partial \omega_{DUT}} \qquad \text{Eq. 4}$$

In a measurement in which the DUT 44 or at least one of the arms 50 and 52 of the test interferometer 42 is subject to vibrations, the vibrations diminish the precision of the measurement. This is because the vibrations in the system act to change the index of refraction of the vibrating component. Changes in the index of refraction function as perturbations to the phase delay of the interferometer 42. Under these conditions, the phase measurement by the test interferometer 42 becomes $$\Phi_{DUT}(t) = 2\pi \left[ v_0 + yt - \frac{y}{2}(T_{DUT} + \eta_{DUT}) \right] (T_{DUT} + \eta_{DUT}) \qquad \text{Eq. 5}$$

$$= \omega \left( t - \frac{(T_{DUT} + \eta_{DUT})}{2} \right) (T_{DUT} + \eta_{DUT})$$

$$= \omega_{DUT}(T_{DUT} + \eta_{DUT})$$

where $\eta_{DUT}(t)$ corresponds to the vibration effects. Eq. 5 is similar to Eq. 2, but the delay $T_{DUT}$ introduced by the DUT 44 is supplemented with the vibration noise. In practice, $\eta_{DUT}(t) \ll T_{DUT}$.

As is known in the art, the interference signal that is input to the detector 58 will have a beat frequency that is a function of the delay path length difference between the two arms 50 and 52 of the test interferometer 42. The beat frequency is described by $$f_b = \gamma T_{DUT} \qquad \text{Eq. 6}$$

from Eq. 6, it can be deduced that reflections from different locations along the first arm 50 of the interferometer 42 will result in different beat frequencies, since the delays associated with the different reflections are different. Using the processor 60, these frequency components can be filtered and analyzed separately to obtain the group delay and magnitude response for each reflection. This provides a mechanism for accurately analyzing a component, such as the DUT 44, in the presence of multiple reflections. Moreover, by providing the partial reflector 54, vibration noise can be quantified and subtracted.

By analogy to Eq. 5, the phase measurement for the partial reflector 54 is $$\Phi_{PR}(t) = 2\pi \left[ v_0 + yt - \frac{y}{2}(T_{PR} + \eta_{PR}) \right] (T_{PR} + \eta_{PR}) \qquad \text{Eq. 7}$$

$$= \omega \left( t - \frac{(T_{PR} + \eta_{PR})}{2} \right) (T_{PR} + \eta_{PR})$$

$$= \omega_{DUT}(T_{PR} + \eta_{PR})$$

where the subscript "PR" indicates that the variable is associated with the partial reflector.

When the partial reflector 54 is in close proximity to the DUT 44, the radian frequencies at the two components will remain substantially the same as the TLS 46 sweeps through its frequency range. That is, $\omega_{DUT} = \omega_{PR}$. Another acceptable approximation is that the two components will experience approximately the same vibration magnitude, i.e., $\eta_{DUT}(t) \approx \eta_{PR}(t)$. This second approximation requires that the vibration effects in the path region between the partial reflector 54 and the DUT 44 remain relatively small compared to $\eta_{DUT}$ and $\eta_{PR}$. However, with the approximations and with the ability to distinguish reflections of the partial reflector from reflections of the DUT, the effects of vibrations can be quantified and/or mitigated.

One approach to mitigating the effects of vibrations is to determine the difference in the phases of interference signals attributable to the partial reflector 54 and to the DUT 44. That is, $$\phi_{diff}(t) = \phi_{DUT}(t) - \phi_{PR}(t) \qquad \text{Eq. 8}$$

From this equation, the group delay of the DUT can be determined as follows:

$$\frac{d\Phi_{diff}}{d\omega_{DUT}}(t) = (T_{DUT} - T_{PR}) + \omega_{DUT} \frac{\partial T_{DUT}}{\partial \omega_{DUT}} - \frac{y}{2} \eta_{DUT} \frac{\partial T_{DUT}}{\partial \omega_{DUT}} \qquad \text{Eq. 9}$$

Eq. 9 gives the relative group delay of the DUT, i.e. the group delay of the DUT with a constant offset, and a vibration error term resulting from the fact that the DUT may be dispersive. The relative group delay is essentially equivalent to the group delay because it also describes the way the group delay of the device varies with optical frequency. Unless the DUT is unusually dispersive, the remaining vibration noise term is negligible and can be disregarded. Therefore, it is possible to state that under almost all situations, the determination of $\phi_{diff}(t)$ allows the reduction of the effects of phase noise in the measurements of DUT characteristics. The quantity of this reduction depends on several properties of the system. If $\eta_{DUT}(t)$ is not generally equivalent to $\eta_{PR}(t)$, the vibration reduction will be less effective. Additionally, if the partial reflector 54 is not located in close proximity to the DUT 44, then $T_{DUT}$ will not be approximately $T_{PR}$ and $\omega_{DUT}$ will not be generally equal to $\omega_{PR}$. Under such conditions, the vibration noise at the partial reflector will be substantially different than the vibration noise at the DUT, rendering the vibration reduction less efficient. Briefly stated, the degree of vibration noise reduction depends on the accuracy of the above-stated approximations.

Figure 3:
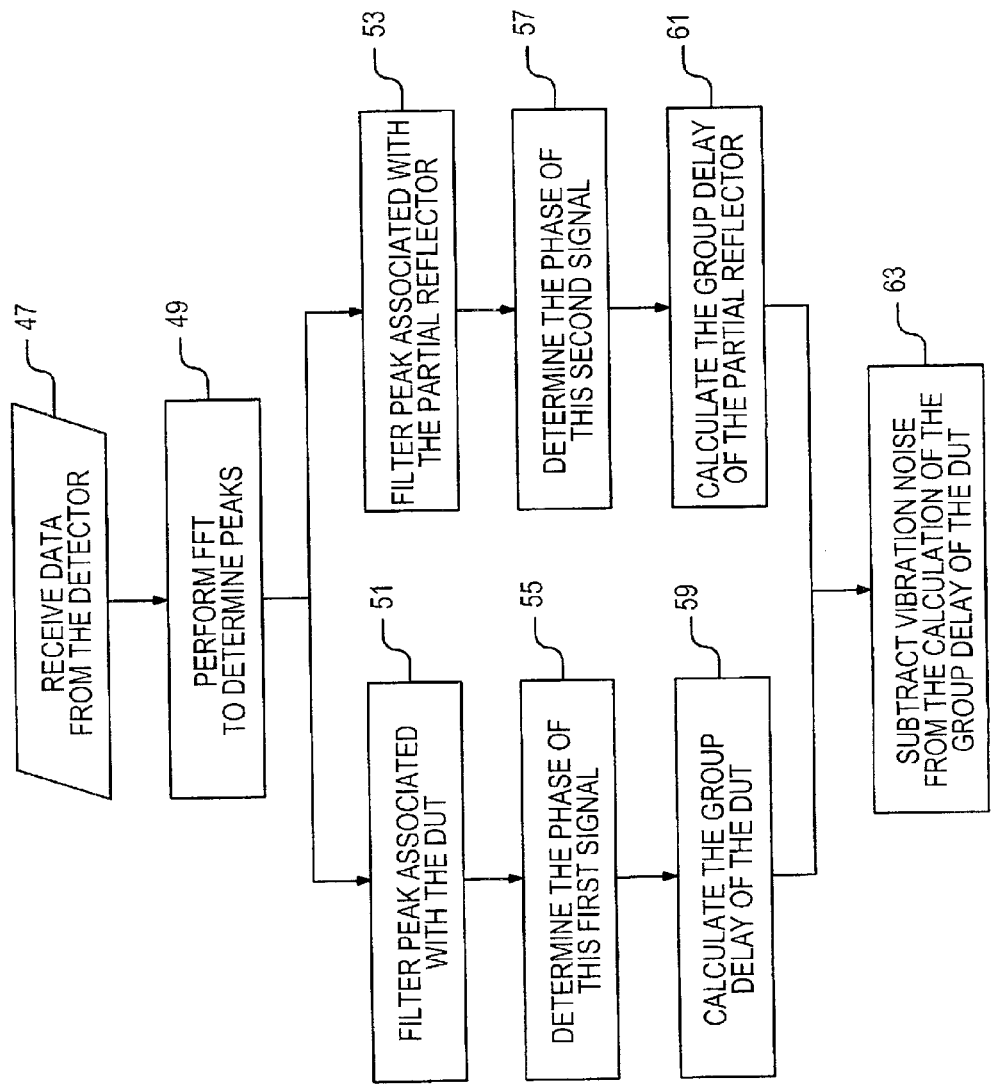
FIG. 3 is a process flow of steps for determining noise-cancelled group delay using the interferometer of FIG. 2.

The processing that occurs within the processor 60 of FIG. 2 will be more succinctly described with reference to FIG. 3. At step 47, the data from the detector 58 is received as an input to the processor. The input data is the measured intensity as a function of the intensities of the light from the two arms 50 and 52, as indicated by Eq. 1. This data is a time-series of intensity data from the detector 58.

In step 49, a Fast Fourier Transform (FFT) of the intensity data is used in determining the locations of a pair of signal peaks at different frequencies. One of the signal peaks corresponds to the partial reflector 54 and the other signal peak corresponds to the DUT 44. The two peaks occur at different frequencies, since the path length to the partial reflector 54 is different than the path length to the DUT. If the positions of the partial reflector and the DUT are precisely known, step 49 is not necessary. Within situations in which the FFT step is performed, an inverse FFT returns the signal to the time domain after the two peaks are identified.

In the corresponding steps 51 and 53, the time domain signal is bandpass filtered for ranges having center frequencies corresponding to the two peaks, thereby generating two interference signals. At step 51, the data that is output from the filtering is an interference signal that is a function of the light reflected from the DUT 44 and the light reflected from the mirror 56. Similarly, within the filtering step 53, the data that is output is a function of the light reflected from the partial reflector 54 and light reflected from the mirror 56. In steps 55 and 57, the phases of the two interference signals are determined. Steps 55 and 57 correspond to Eq. 5 and Eq. 7, respectively.

At steps 59 and 61, the group delays of the DUT 44 and the partial reflector 54 are calculated. Initially, the effects of vibration are disregarded, so a derivative with respect to optical frequencies may be performed at step 59, as in Eq. 4, while a corresponding procedure is used at step 61. The group delay of the partial reflector 54 is a constant over wavelength, so that any deviation from a constant value of group delay can be assumed to result from vibration noise within the two arms 50 and 52 of the interferometer 42. Consequently, at step 63, the vibration noise can be subtracted from the calculation of the group delay of the DUT. Simply, the group delay of the partial reflector can be subtracted from the group delay of the DUT to obtain the relative group delay and eliminate the vibration noise.

Figure 4:
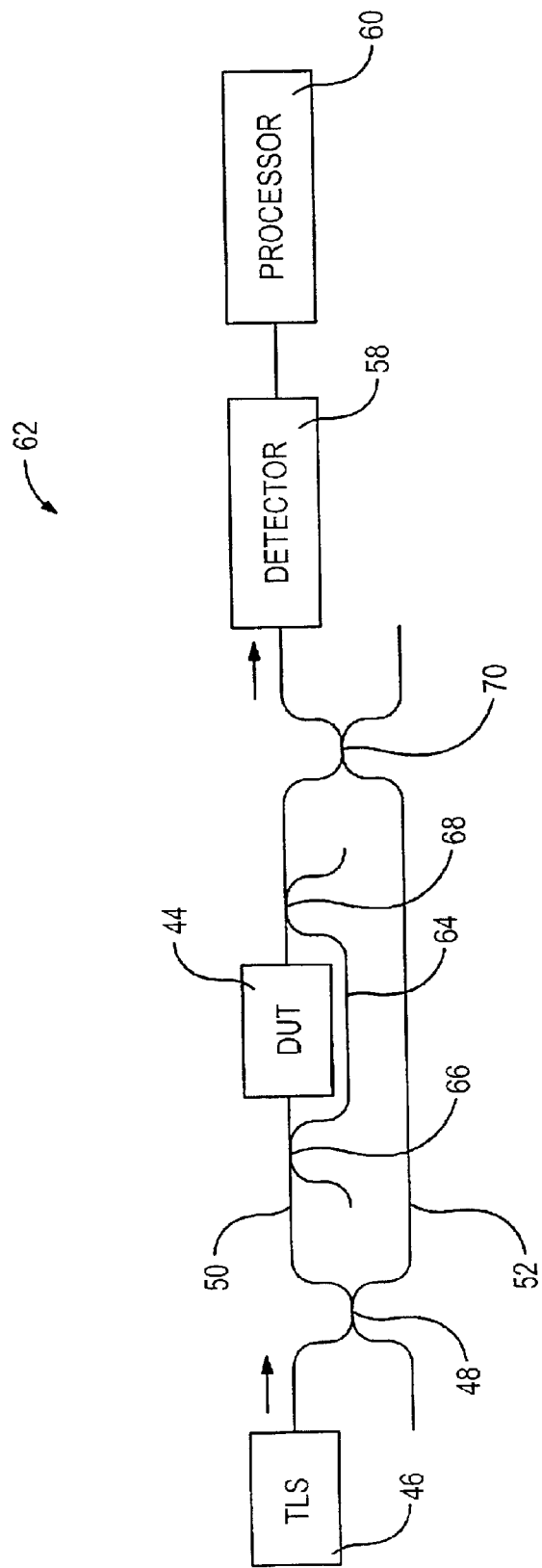
FIG. 4 is a block diagram of a transmission interferometer in accordance with a second embodiment of the invention.

By analogy to the method described with reference to FIG. 2, a method may be designed to permit vibration noise reduction in transmission interferometer measurements. A possible configuration is shown in FIG. 4, wherein components that were described with reference to FIG. 2 are given the same reference numerals. The configuration of FIG. 4 is consistent with conventional transmission interferometer architectures, but a shunt 64 in parallel with the DUT 44 is included. The shunt provides a path for routing a small portion of the light around the DUT 44. That is, while the first coupler 48 may evenly divide the beam from the TLS 46, a first shunt coupler 66 may be far less efficient, so that most of the light propagating along the first arm 50 continues through the DUT. A second shunt coupler 68 recombines the light with that portion of the beam that passed through the DUT. The recombined light is combined with the light beam from the second path 52 by a second main coupler 70. As a result, an interference signal is received at the detector 58, which provides an output that is analyzed by the processor 60.

The shunt 64 around the DUT 44 experiences the same magnitude of vibration as the DUT. If the path through the DUT has a length similar to that of the shunt 64, the vibration noise terms will be generally equal. Consequently, the phase difference ($\phi_{diff}$) approach may be used to mitigate the effects of vibration in calculations of group delay and other optical characteristics of the DUT.

While the determination of a phase difference $\phi_{diff}$ provides the desired phase noise mitigation, other techniques may be employed. Referring to FIG. 4, if the interferometer 62 is combined with a reference interferometer and a means for controlling any phase noise, it will be possible to isolate different causes of variations within the system. Using the process that was described with reference to FIG. 3, but adapted to consider data from the reference interferometer, enables the reduction of the effects of vibration noise in measurements relating to the DUT 44.

Figure 5:
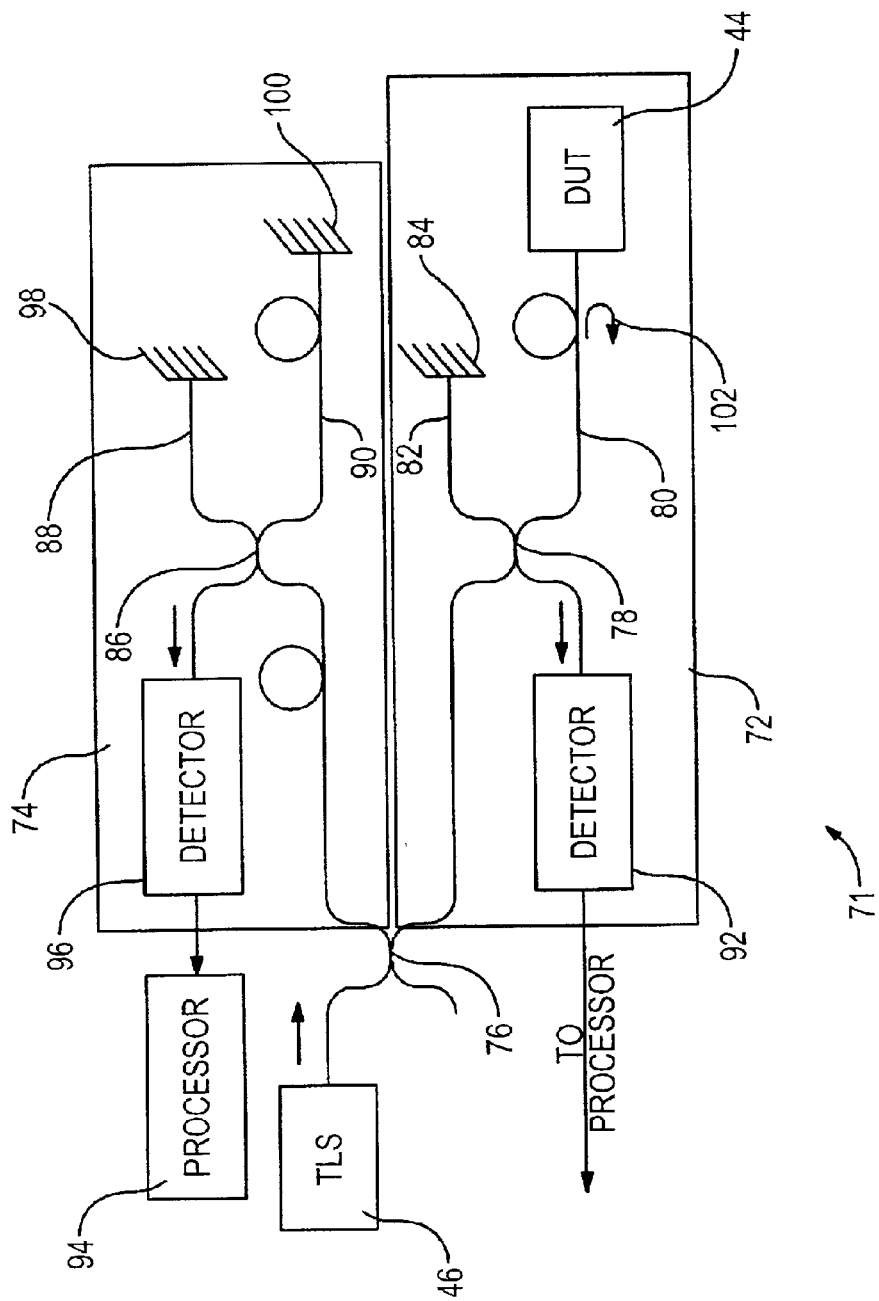
FIG. 5 is a block diagram of a heterodyne optical network analyzer that utilizes Rayleigh Backscatter as a means for reducing the effects of vibration noise, in accordance with a third embodiment of the invention.

FIG. 5 shows a heterodyne optical network analyzer 71 that includes both a test interferometer 72 and a reference interferometer 74. The swept frequency light from the TLS 46 is divided into beam portions by a coupler 76. Within the test interferometer 72, a second coupler 78 divides one of the beam portions between a DUT arm 80 and a second arm 82. The DUT 44 is connected along the DUT arm, while a mirror 84 is connected at the end of the second arm 82. The reference interferometer includes a third coupler 86 that divides its beam portion between a third arm 88 and a fourth arm 90.

During operation, an interference signal that is generated as a result of reflections from the two arms 80 and 82 of the test interferometer 72 is converted into an electrical signal by a detector 92. This electrical signal is one input of a processor 94. The second input of the processor is an electrical signal from a detector 96 of the reference interferometer 74. The output of the detector 96 is responsive to an interference signal provided by reflections from mirrors 98 and 100 at the ends of the arms 88 and 90 of the reference interferometer. As is known in the art, the reference interferometer is used to measure the frequency sweep, so that this variable can be closely monitored in determining the optical characteristics of the DUT 44.

From Eq. 6, it can be seen that the beat frequency of the interference signal attributable to the DUT 44 is a function of the delay path length difference between the two arms 80 and 82 of the interferometer. However, using the capability of the processor 94, it is possible to filter and separately analyze frequency components to obtain information regarding characteristics of other reflections.

Rayleigh Backscatter results from inhomogeneities of a random nature occurring on a small scale compared to the wavelength of the light. The inhomogeneities manifest themselves as refractive index fluctuations. The fluctuations result in the reflection of a portion of the optical beam portion propagating through the inhomogeneities. Thus, the inhomogeneities close to the DUT 44 may be used in the same manner as the partial reflector 54 in FIG. 2. Arrow 102 in FIG. 5 represents the Rayleigh Backscatter from the inhomogeneities.

Figure 6:
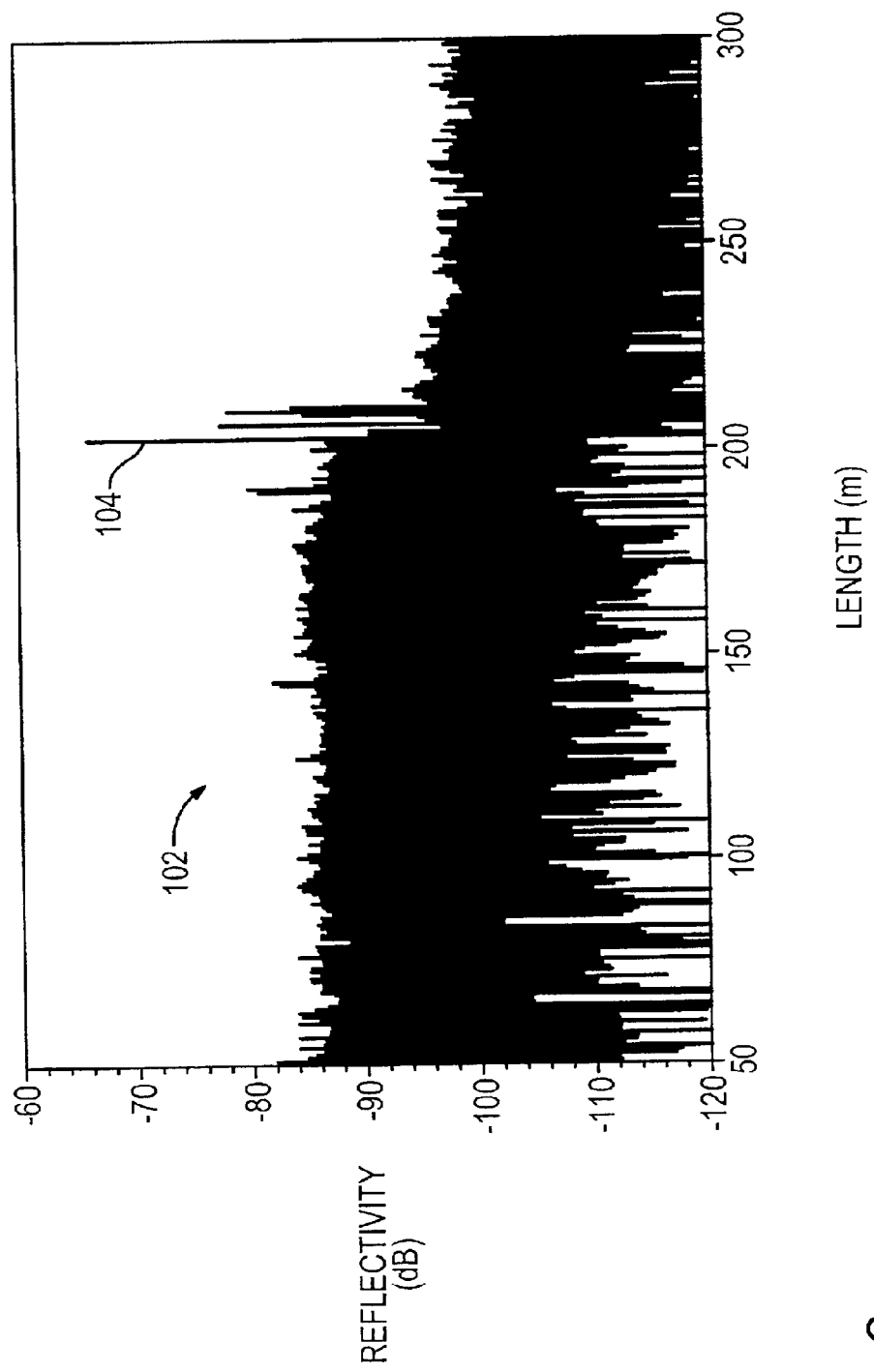
FIGS. 6 and 7 illustrate examples of measures of Rayleigh Backscatter as a function of length along the DUT path of FIG. 5.
Figure 7:
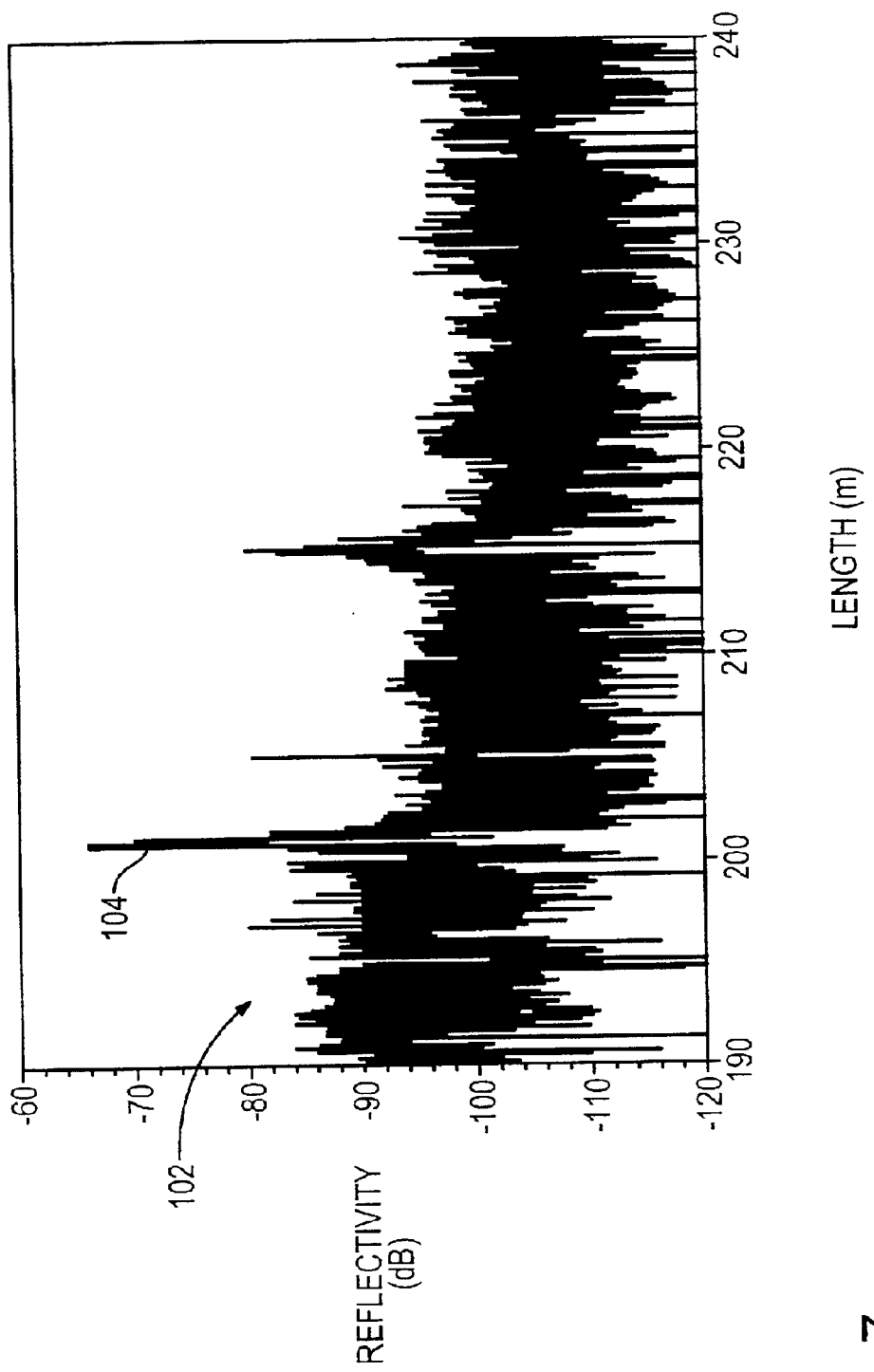

In an experiment, a single-mode fiber having a length of 200 meters was used as the DUT 44 in a heterodyne optical network analyzer 71 of the type shown in FIG. 5. Partial results of the experiment are represented in FIGS. 6 and 7, which show levels of reflectivity as a function of length along the DUT arm. A reflectivity spike 104 occurs at the position of a connector for coupling the single-mode fiber to the DUT arm 80 of the test interferometer 72. Rayleigh Backscatter 102 is measurable along the length. Optionally, a noise floor can be designated and Rayleigh Backscatter that exceeds the noise floor may be selected for calculations that are to occur within the vibration noise reduction approach. As with the partial reflector of FIG. 2, the preferred position for monitoring the effects of vibration is the position as close as possible to the DUT 44, which is indicated by the connector spike 104.

To reduce the vibration noise effects in the calculation of the group delay of the DUT 44, information regarding the Rayleigh Backscatter reflection 102 may be extracted from the interference signal to the detector 92, allowing the vibration effects at the inhomogeneities to be monitored. By selecting inhomogeneities that are close to the DUT, it can be assumed that the same vibrations are experienced by the DUT. That is, monitoring the Rayleigh Backscatter reflection and isolating vibration effects on the back-scatter enables vibration noise to be subtracted from the DUT group delay response. The same approach may be taken for determining optical characteristics other than group delay.

Figure 8:
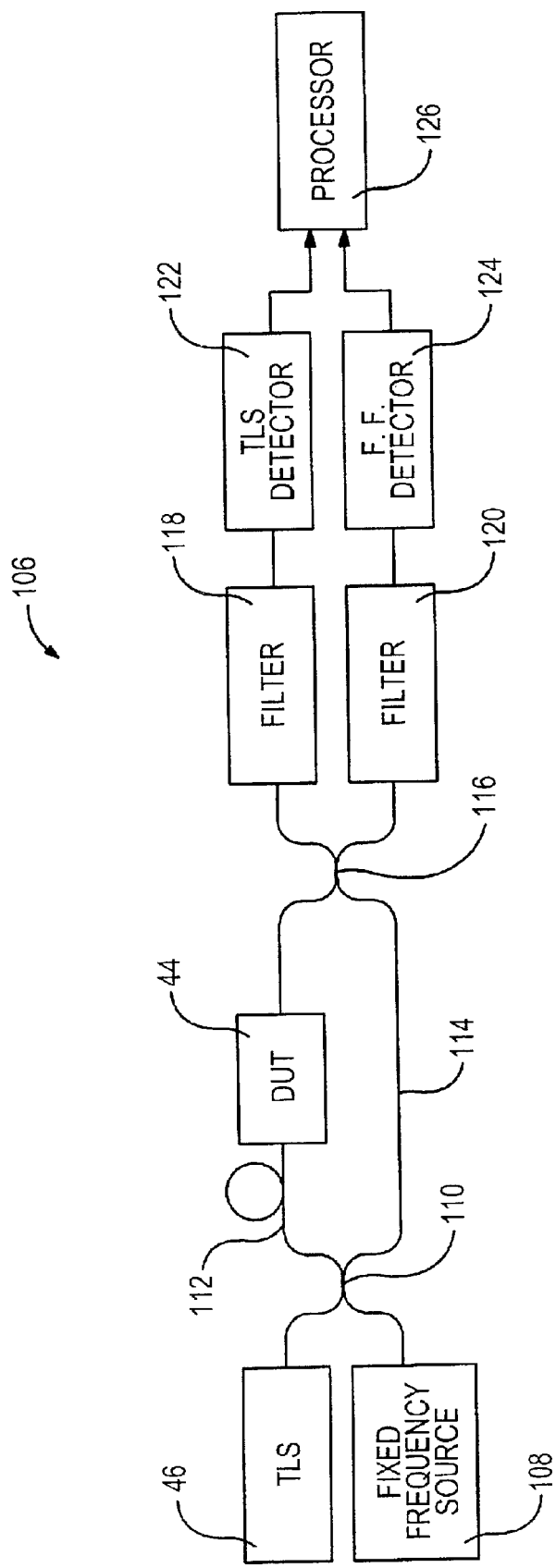
FIG. 8 is a block diagram of a transmission interferometer that provides vibration noise reduction in accordance with a fourth embodiment.

Another embodiment of the invention is illustrated in FIG. 8. In this configuration of an interferometer 106, a fixed frequency source 108 is used in combination with the conventional TLS 46. A coupler 110 divides a fixed frequency beam from the source 108 and divides a swept frequency beam from the TLS. Beam portions from both sources propagate through a DUT arm 112 and a second arm 114, but are recombined at a downstream coupler 116. The beam portions interfere when they are recombined at the coupler. One of the output ports of the coupler 116 has a filter 118 that is preferential to passing light from the TLS. On the other hand, the other output port includes a filter 120 that is preferential to passing the light from the fixed frequency source 108. The output of the filter 118 is a first interference signal that is directed to a TLS detector 122. A second interference signal from the filter 120 is directed to a fixed frequency detector 124. The filters may be optical filters, but by changing the configuration of the filters and detectors, the preferential filtering may be carried out in computer software.

The outputs of the TLS detector 122 and the fixed frequency detector 124 are received by a processor 126. With regard to the interference signal from the TLS detector 122, the equations that were described with regard to measured intensity and phase apply here. For the output of the fixed frequency detector 124, by analogy to Eq. 1, the intensity of the interfering fixed frequency light as a function time t is $$I_{ff}(t)=I_{ff_{arm1}}+I_{ff_{arm2}}+2(I_{ff_{arm1}}I_{ff_{arm2}} \cos \phi_{ff}t) \quad \text{Eq. 10}$$

where the subscript component "ff" denotes fixed frequency. Similarly, by analogy to Eq. 7, the phase measurement for the output of the fixed frequency detector is $$\phi_{ff}(t)=\omega_{ff}(T_{ff}+\eta_{ff}(t)) \quad \text{Eq. 11}$$

where $\omega_{ff}$ is the fixed optical radian frequency of the fixed frequency light and $\eta_{ff}$ represents the vibrational fluctuations. Since $\omega_{ff}$ and $T_{ff}$ are constants, any fluctuations of the phase measurement $\phi_{ff}$ are due to vibrational fluctuations. The isolation of the measurements of the vibrational fluctuations enables cancellation of the vibration noise within the signal from the TLS detector 122.

The method may be modified in situations in which the DUT 44 does not transmit light at the fixed frequency of the source 108. The available modifications include (1) changing the frequency of the source to one that is transmitted by the DUT and (2) selecting a frequency for the source that is within the frequency range of the TLS. That is, while the fixed frequency is preferably outside of the frequency range of the TLS 46, there may be applications in which the fixed frequency is within the range. However, this adds a level of complexity.

Another modification to the transmission interferometer 106 of FIG. 8 is that the two filters 118 and 120 and the two detector 122 and 124 could be replaced by a single detector. Very little of the total power of the vibration fluctuations is likely to occur at the beat frequency $f_b$ generated in correspondence with the TLS sweep. Thus, a software filter that is preferential to passing the beat frequency would enable measurements of the optical characteristics of the DUT 44, with a software filter being used to pass frequencies related to the vibration fluctuations in order to measure vibration noise.

Figure 9:
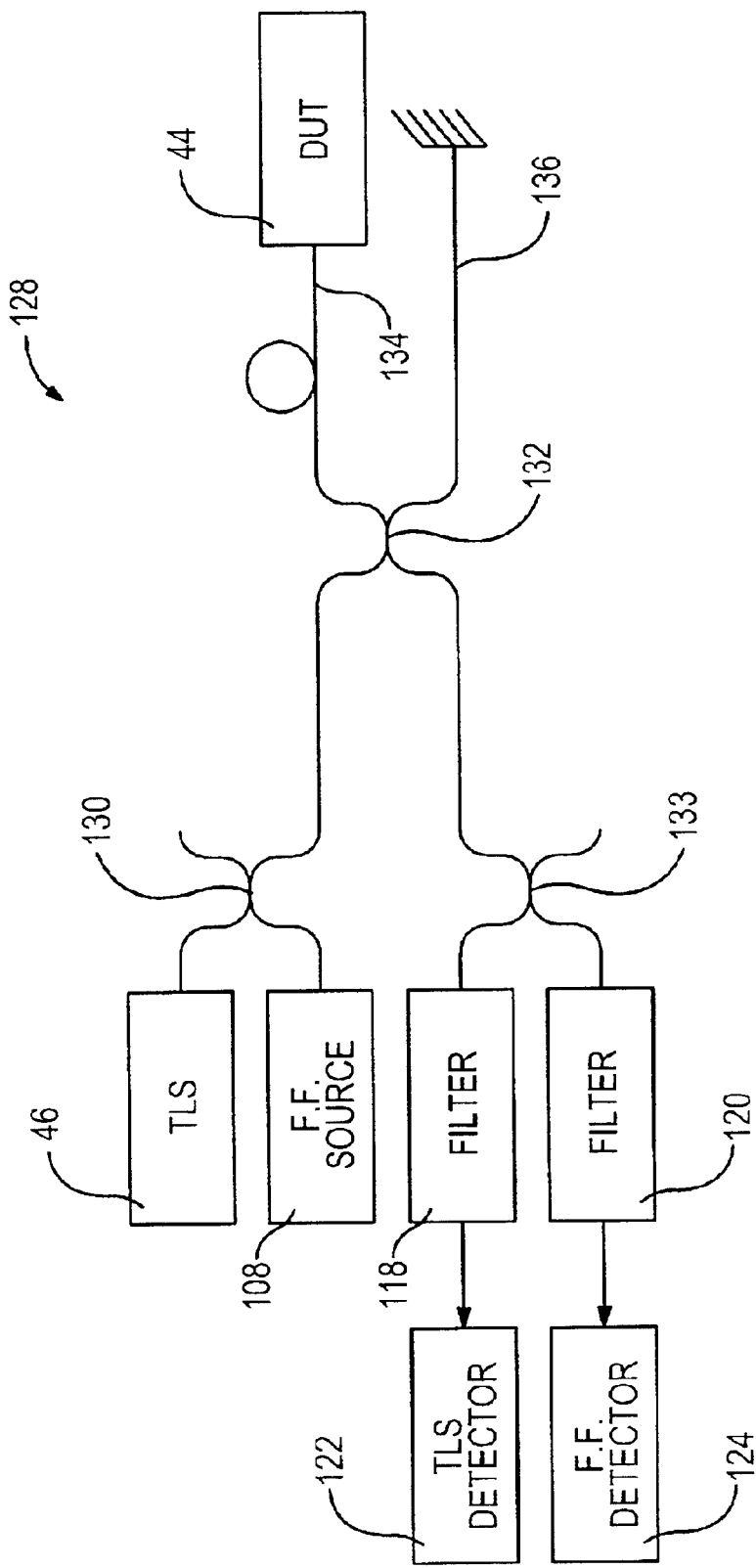
FIG. 9 is a block diagram of a reflection interferometer having a fixed frequency light source to enable vibration noise reduction in accordance with a fifth embodiment.

The approach described with reference to the transmission interferometer 106 of FIG. 8 may be applied to reflection interferometer architectures. Referring now to FIG. 9, a reflection interferometer 128 includes many of the components of the transmission interferometer of FIG. 8. A swept frequency beam is generated by the TLS 46, while a fixed frequency beam is generated by the source 108. A coupler 130 combines the two beams. A second coupler 132 provides beam portions for a DUT arm 134 and a second arm 136. Reflected light from the two arms is recombined by the coupler 132. The recombined light is split by a third coupler 133 and the split light is filtered and separately detected by the filters 118 and 120 and the detectors 122 and 124.

The reflection interferometer 128 will operate in the same manner that was described with reference to the transmission interferometer, but some difficulties may occur if the DUT does not reflect the fixed frequency from the source 108. As above, various techniques can be applied to overcome this difficulty.

Figure 10:
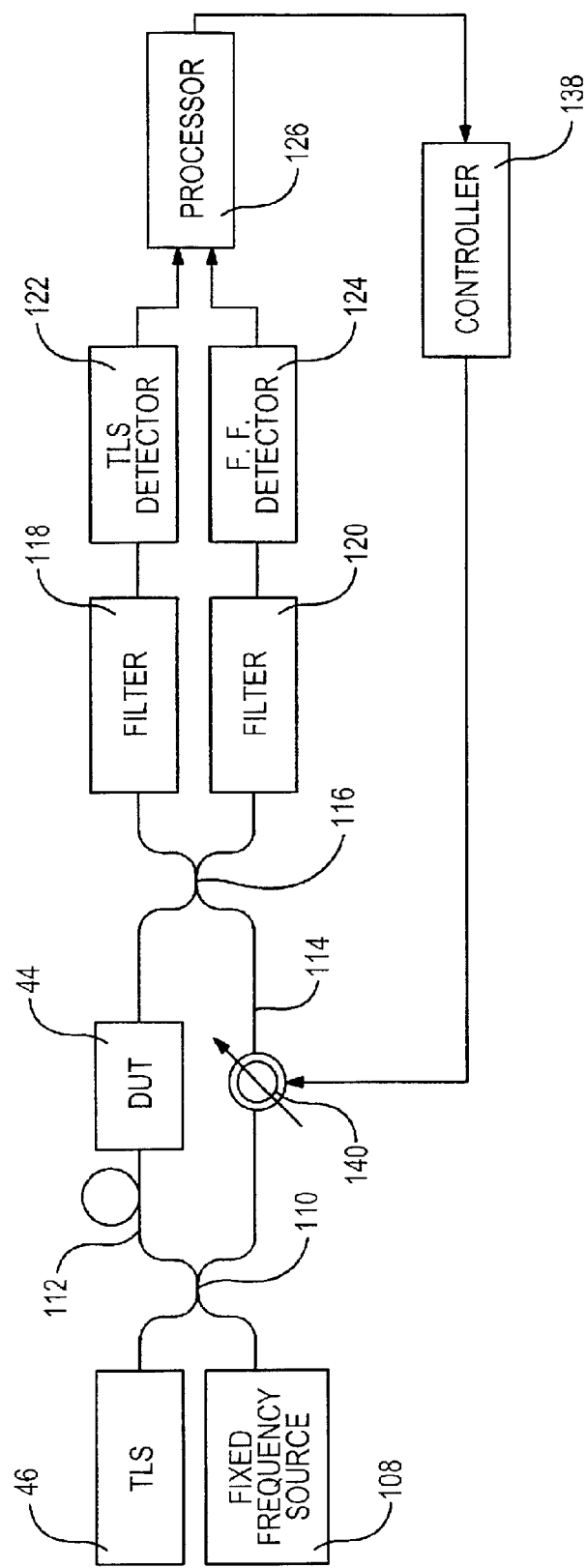
FIGS. 10 and 11 are modifications of the interferometers of FIGS. 8 and 9, respectively.
Figure 11:
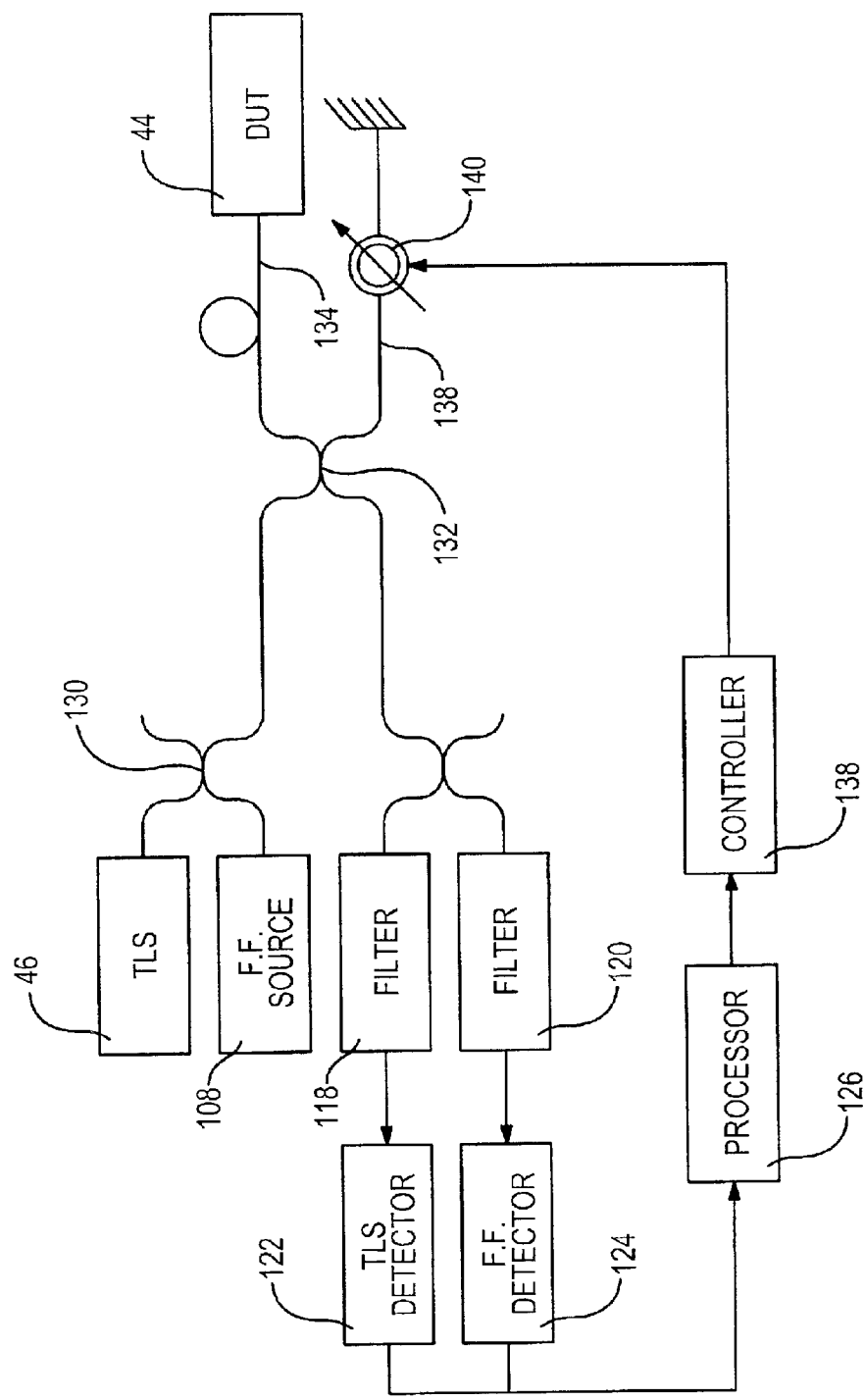

Active vibration cancellation has also been contemplated. With reference to FIG. 10, a controller 138 and a piezoelectrically driven cylinder 140 have been added to the transmission interferometer of FIG. 8. The cylinder allows the length of the second arm 114 to be dynamically adjusted. For example, a piezoelectric cylinder may be used to selectively stretch a fiber that is wrapped around the cylinder. The wrapped fiber is a portion of the second arm, so that stretching the fiber or relaxing the stretch of the fiber varies the arm length. The controller 138 is responsive to the processor 126 in its regulation of the operations of the piezoelectrically driven cylinder. As patterns in the vibration noise are detected, the controller 138 may be used to at least partially offset the fluctuations that cause the patterns. As a consequence of the fluctuation offsets, the measurements of the optical characteristics of the DUT 44 will improve in accuracy. The same process is shown for a reflection interferometer in FIG. 11. Vibration fluctuations are reduced in effect by including the controller 138 and the piezoelectrically driven cylinder 140. In both FIGS. 10 and 11 other mechanisms for dynamically varying the length of the second arm may be substituted for the piezoelectrically driven cylinder, as will be recognized by persons skilled in the art. Moreover, the length of the first arm of an interferometer may be dynamically adjusted, but the conditions for lengthening or shortening will be reversed in comparison to the embodiments illustrated in FIGS. 10 and 11.

What is claimed is:

1. A method of reducing vibration noise in an interferometric system comprising the steps of:
   propagating light through first and second paths of said interferometric system;
   combining said light from said first and second paths to provide an interference signal from which optical characteristics of a component that is connected to said first path are identified;
   detecting vibrations along said first path by monitoring patterns of said light; and
   on a basis of detections of said vibrations, providing corrections that at least partially offset effects of said vibrations in identifying said optical characteristics.

2. The method of claim 1 wherein detecting vibrations includes monitoring optical events along said first path at a position adjacent to said component, where said optical events are determined to be indicative of vibrational responses at said position.

3. The method of claim 2 wherein detecting vibrations includes monitoring Rayleigh Backscatter along said position adjacent to said component, said component being a device under test (DUT).

4. The method of claim 3 wherein providing corrections includes determining vibrational noise at said position and adjusting said interference signal based on calculations of said vibrational noise, where said calculations use said Rayleigh Backscatter.

5. The method of claim 1 wherein said step of propagating light includes simultaneously introducing a first beam having a sweeping frequency and introducing a second beam having a fixed frequency, said step of providing corrections to at least partially offset said effects of vibrations being based on light interference during combining portions of said second beam following propagation into said first and second paths, said light interference being indicative of vibration events.

6. The method of claim 5 wherein said step of providing corrections that at least partially offset effects of said vibrations includes using calculations relating to said light interference as a basis for dynamically canceling said vibration noise from said interference signal that is used to identify said optical characteristics of said component.

7. The method of claim 5 wherein said step of providing corrections includes dynamically varying a length of said first or said second path on a basis of calculations of said light interference.

8. A method of reducing vibration noise in an interferometric system comprising the steps of:
   propagating light through first and second paths of said interferometric system;
   combining said light from said first and second paths to provide an interference signal from which optical characteristics of a component that is connected to said first path are identified;
   detecting vibrations along said first path by monitoring patterns of said light, including monitoring optical events along said first path at a position adjacent to said component, where said optical events are determined to be indicative of vibrational responses at said position; and
   on a basis of detections of said vibrations, providing corrections that at least partially offset effects of said vibrations in identifying said optical characteristics, wherein monitoring said optical events includes providing a partial reflector at said position adjacent to said component and monitoring reflections of said light by said partial reflector, said component that is adjacent to said partial reflector being a device under test (DUT).

9. The method of claim 8, wherein providing corrections that at least partially offset said effects of said vibrations includes determining a difference in a phase of said interference signal and a phase of a second interference signal that is indicative of reflections by said partial reflector.

10. A method of reducing vibration noise in an interferometric system comprising the steps of:
    propagating light through first and second paths of said interferometric system;
    combining said light from said first and second paths to provide an interference signal from which optical characteristics of a component that is connected to said first path are identified;
    detecting vibrations along said first path by monitoring patterns of said light; and
    on a basis of detections of said vibrations, providing corrections that at least partially offset effects of said vibrations in identifying said optical characteristics, wherein detecting vibrations includes forming a shunt path across said component and monitoring optical events along said shunt path, said step of providing corrections that at least partially offset said effects of said vibrations including basing said corrections on said optical events.

11. The method of claim 10 wherein providing corrections that at least partially offset said effects of said vibrations includes determining a difference in a phase of said interference signal and a second interference signal that is responsive to light propagating through said shunt path.

12. An interferometric system comprising:
    a source of a coherent light beam, said source being configured to vary the frequency of said beam;
    a first optical path coupled to said source to receive a first portion of said beam, said first optical path including a device under test;
    a second optical path coupled to said source to receive a second portion of said beam;
    a coupler connected to said first and second optical paths to combine said first and second portions of said beam, thereby providing an interference signal; and
    a processor that receives the interference signal from the coupler, detects optical characteristics of the device under test from variations of the interference signal, and detects vibration effects on said interference signal by monitoring optical activity along said first optical path adjacent to said device under test.

13. The interferometric system of claim 12 wherein said processor distinguishes Rayleigh Backscatter along said first optical path at a position adjacent to said device under test.

14. The interferometric system of claim 13 wherein said processor computes a phase difference between a phase of an interference signal component based on said device under test and a phase of an interference signal component based on said Rayleigh Backscatter.

15. An interferometric system comprising:
    a source of a coherent light beam, said source being configured to vary the frequency of said beam;
    a first optical path coupled to said source to receive a first portion of said beam, said first optical path including a device under test;

a second optical path coupled to said source to receive a second portion of said beam;

a coupler connected to said first and second optical paths to combine said first and second portions of said beam, thereby providing an interference signal; and a processor connected to said coupler to receive said interference signal, said processor being configured to detect optical characteristics of said device under test on the basis of said variations of said interference signal attributed to said device under test and being configured to detect vibration effects on said interference signal by monitoring optical activity along said first optical path adjacent to said device under test, wherein said first optical path includes a partial reflector, said processor being enabled to distinguish reflections by said partial reflector, thereby enabling said detection of said vibration effects.

16. The interferometric system of claim 15 wherein said processor is configured to determine a phase difference between a phase of an interference signal component based upon said device under test and an interference signal component based on said partial reflector.

17. An interferometric system comprising:

a source of a coherent light beam, said source being configured to vary the frequency of said beam;

a first optical path coupled to said source to receive a first portion of said beam, said first optical path including a device under test;

a second optical path coupled to said source to receive a second portion of said beam;

a coupler connected to said first and second optical paths to combine said first and second portions of said beam, thereby providing an interference signal; and a processor connected to said coupler to receive said interference signal, said processor being configured to detect optical characteristics of said device under test on the basis of said variations of said interference signal attributed to said device under test and being configured to detect vibration effects on said interference signal by monitoring optical activity alone said first optical path adjacent to said device under test, wherein said first optical path includes a shunt path that is parallel to said device under test, said processor being enabled to respond to variations in a shunt path interference signal component and to provide cancellation of said vibration effects on a basis of said variations.

18. The interferometric system of claim 17 wherein said processor is further configured to determine a phase difference between a phase of said shunt path interference signal component and an interference signal component based on said device under test.

19. An interferometric system comprising:

a first source of a sweeping beam, said first source being configured to continuously vary the frequency of said sweeping beam;

a first optical path coupled to said source to receive a first beam portion of said sweeping beam;

a second optical path coupled to said source to receive a second beam portion of said sweeping beam;

a second source of a fixed frequency beam connected to introduce a third beam portion into said first optical path and to introduce a fourth beam portion into said second optical path;

a coupler connected to combine light from said first and second optical paths;

a processor that distinguishes a first interference pattern formed as a combination of said first and second beam portions from a second interference pattern formed as a combination of said third and fourth beam portions; and a vibration noise reducer that at least partially offsets effects of vibration noise of said first interference pattern on a basis of variations in said second interference pattern.

20. The interferometric system of claim 19 wherein said vibration noise reducer includes a mechanism for dynamically varying a length of one of said first and second optical paths on said basis of said variations.

21. The interferometric system of claim 20 wherein said mechanism includes a piezoelectric member controlled by a control circuit, said control circuit being responsive to said second interference pattern.

22. The interferometric system of claim 19 wherein said processor includes a first filter which preferentially passes frequencies of said sweeping beam and includes a second filter which preferentially passes the frequency of said fixed frequency beam.

23. The interferometric system of claim 22 wherein said processor includes a first detector connected to said first filter for generating a first interference signal that is responsive to said first interference pattern and includes a second detector connected to said second filter for generating a second interference signal that is responsive to said second interference pattern.

24. The interferometric system of claim 23 wherein said processor is enabled to determine phases of said first and second interference signals.

25. The interferometric system of claim 24 wherein said processor is configured to calculate vibration noise reductions on a basis of said phases, said vibration noise reducer being implemented in computer software.

* * * * *